United States Patent [19]
Di Pietro et al.

[11] Patent Number: 5,544,897
[45] Date of Patent: Aug. 13, 1996

[54] CARTRIDGE SEAL HAVING A HIGH CONTACT PRESSURE SEAL AND MEANS FOR INTERSLEEVE ADJUSTMENT INCLUDING QUENCH FLUID DELIVERY

[75] Inventors: Larry Di Pietro, Middleton, Mass.; Henri Azibert, Winohan, N.H.

[73] Assignee: A. W. Chesterton Co., Stoneham, Mass.

[21] Appl. No.: 108,452

[22] Filed: Aug. 19, 1993

[51] Int. Cl.⁶ ................................................ F16J 15/34
[52] U.S. Cl. .......................... 277/81 R; 277/85; 277/88
[58] Field of Search .......................... 277/15, 110, 112, 277/81 R, 87, 88, 93 R, 935 D, 65, 59, 38, 96.1, 82, 85, 116.2, 71, 72 R, 212 F, 74, 77, 207, 126

[56] References Cited

U.S. PATENT DOCUMENTS

| | | | |
|---|---|---|---|
| 4,3 6,785 | 6/1983 | Back | 277/82 |
| 1,308,454 | 7/1919 | Somes . | |
| 1,470,587 | 10/1923 | Somes . | |
| 1,700,731 | 2/1929 | Baker | 277/87 |
| 1,851,076 | 3/1932 | Ackerman | 277/65 |
| 1,882,679 | 10/1932 | White . | |
| 2,094,160 | 9/1937 | Oldberg | 286/11 |
| 2,189,686 | 2/1940 | Stevenson | 308/36.2 |
| 2,247,505 | 7/1941 | Kohler | 286/8 |
| 2,297,302 | 9/1942 | Hornschuch | 286/7 |
| 2,362,436 | 11/1944 | Stratford | 286/7 |
| 2,374,353 | 4/1945 | Jacobsen | 286/7 |
| 2,447,663 | 8/1948 | Payne | 286/11 |
| 2,698,195 | 12/1954 | Pollard, Jr. | 286/11.14 |
| 2,858,149 | 10/1958 | Laser | 277/81 |
| 2,859,054 | 11/1958 | Willi | 286/11.15 |
| 2,992,842 | 7/1961 | Sheuchenko et al. | 286/9 |
| 3,029,081 | 4/1962 | Marsh | 277/59 |
| 3,031,197 | 4/1962 | Wilkinson | 277/74 |
| 3,068,014 | 12/1962 | Wilkinson | 277/68 |
| 3,218,085 | 11/1965 | Grace | 277/59 |
| 3,356,378 | 12/1967 | Tracy | 277/136 |
| 3,467,396 | 9/1969 | Hershey | 277/65 |
| 3,588,124 | 6/1971 | Guinard | 277/59 |
| 3,612,548 | 10/1971 | Tracy | 277/74 |
| 3,672,689 | 6/1972 | Hadley | 277/38 |
| 3,675,933 | 7/1972 | Nappe | 277/9 |
| 3,715,169 | 2/1973 | Molis | 415/170 |
| 3,776,560 | 12/1973 | Wentworth | 277/88 |
| 3,788,650 | 1/1974 | Place | 277/38 |
| 3,926,442 | 12/1975 | Muller | 277/3 |
| 4,136,887 | 1/1979 | Wentworth | 277/93 SD |
| 4,174,844 | 11/1979 | Zobens | 277/85 |
| 4,268,232 | 5/1981 | Haupt | 418/135 |
| 4,328,973 | 5/1982 | Delbridge | 277/3 |
| 4,377,290 | 3/1983 | Netzel | 277/38 |
| 4,408,765 | 10/1983 | Adelmann | 277/85 |
| 4,443,015 | 4/1984 | Duffee et al. | 277/30 |
| 4,625,977 | 12/1986 | Azibert et al. | 277/82 |
| 4,632,402 | 12/1986 | Daeyaert | 277/15 |
| 4,842,286 | 6/1989 | Heilala | 277/38 |
| 4,889,348 | 12/1989 | Amundson et al. | 277/1 |
| 4,973,065 | 11/1990 | Habich | 277/87 |
| 5,116,066 | 5/1992 | Crawford | 277/81 R |

FOREIGN PATENT DOCUMENTS

| | | |
|---|---|---|
| 0126335 | 11/1984 | European Pat. Off. . |
| 714377 | 11/1941 | Germany . |
| 2097072 | 10/1982 | United Kingdom . |
| 2217398 | 10/1989 | United Kingdom . |

*Primary Examiner*—Scott W. Cummings
*Attorney, Agent, or Firm*—Hill, Steadman & Simpson

[57] ABSTRACT

An improved mechanical seal of the cartridge-type providing an inboard compressed packing seal between dual shaft sleeves and the pump shaft, compressed between the shaft sleeves by action of a plurality of radially arranged set screws. A sharp edge loaded gasket arrangement between axially stacked components which make up the rotary face, the stationary face, the bellows assembly and gland is provided. The axially stacked arrangement is reversible to accommodate either a stationary bellows or rotary bellows application. An annular channel between inner and outer shaft sleeves provides a flow channel for quench fluid flowing annularly inboard to the seal faces and outboard to a quench fluid exit, providing for a uniform annular quench flow.

22 Claims, 2 Drawing Sheets

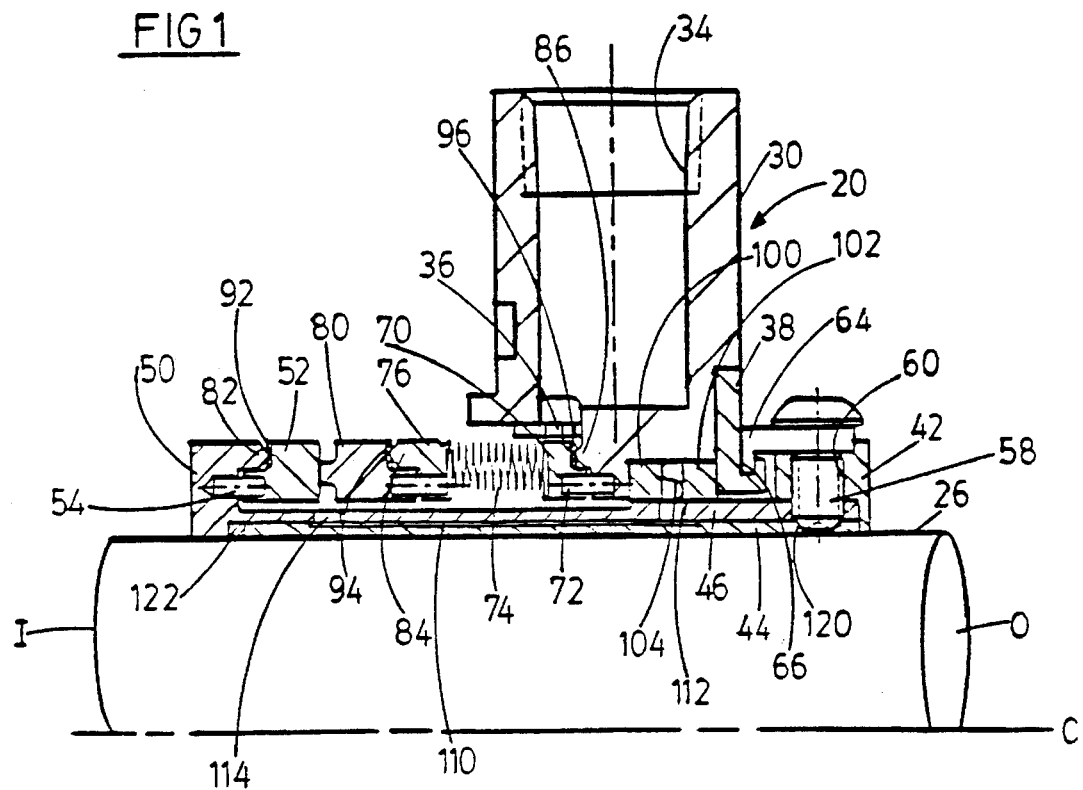
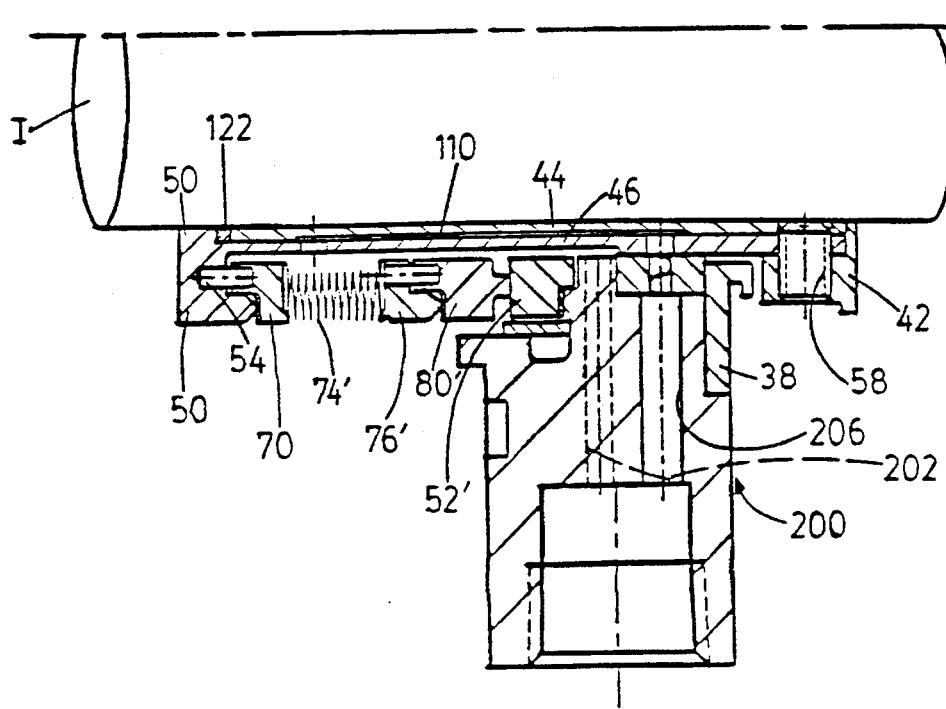

CARTRIDGE SEAL HAVING A HIGH CONTACT PRESSURE SEAL AND MEANS FOR INTERSLEEVE ADJUSTMENT INCLUDING QUENCH FLUID DELIVERY

BACKGROUND OF THE INVENTION

The present invention relates to mechanical seals for rotating shafts, such as a cartridge seal for a pump shaft. Mechanical seals have face sealing rings, one of the sealing rings fixed for rotation with the pump shaft and the respective other sealing ring fixed and sealed to the housing such as a pump casing. The contact faces of the sealing rings are made of abrasion-resistant and seal enhancing materials. In a bellows-type cartridge seal, a multi-folded, spring acting, bellows urges the seal faces together which allows a take-up for wear of the seal faces as well as a tight sealing between the faces. Such a cartridge seal is disclosed in U.S. Pat. No. 4,973,065. The bellows can either be arranged to press the stationary face against the rotating face or can be arranged to rotate with the rotating face, and press the rotating face against the stationary face.

Friction between the rotating and stationary face of the sealing rings can generate a significant amount of heat. It is known to provide a quenching fluid in contact with the interface between the rotating and stationary sealing rings to control temperature. Additionally, the pumped fluid can itself provide a source of heat.

Secondary seals are generally provided between the stationary and rotating seal face carrying members and their supporting components, such as stationary seal face holders and bellows holders. These secondary seals are typically accomplished by O-ring-type seals as described in U.S. Pat. Nos. 3,675,933, 3,788,650, or 4,174,844. When using a shaft mounted sleeve to hold the rotary components for the rotating face seal, a secondary seal is provided between the shaft mounted sleeve and the shaft. U.S. Pat. No. 3,675,933 shows an O-ring seal to effect this sealing.

SUMMARY OF THE INVENTION

It is an object of the present invention to provide an effective, optimally manufactured, easily installed, easily disassembled and reassembled, mechanical seal assembly. It is an object of the present invention to provide a mechanical seal assembly which provides effective secondary seals to adjacent components such as fixed and rotary seal ring holders and bellows holders. It is an object of the invention to provide an inboard located effective secondary seal between the shaft sleeve and the equipment shaft to effectively prevent "coking" or contamination or deposits penetrating between the shaft sleeve and the shaft which prevents easy removal of the shaft sleeve during maintenance periods. It is an object of the invention to provide an effective flow arrangement for quench fluid which passes annularly past the interface between the stationary seal ring and the rotating seal ring and through the bellows to an exit of the seal arrangement.

It is an object of the present invention to provide an axially stacked arrangement of a rotary seal ring holder, a rotary seal ring, a stationary seal ring, a stationary seal ring holder/bellows holder, a bellows, and a bellows holder which can be axially rearranged from a rotary bellows arrangement to a stationary bellows arrangement using the same named components.

These objects are inventively achieved by providing that the fixed seal ring holder and/or the bellows seal ring holder and/or the gland are sealed to the rotating seal ring or the stationary seal ring by a substantially edge loaded sealing interface when viewed in section, and which effectively provide a circular sharp edge interface when the components are mated together. Arranged between the edge loaded profile and the next adjacent component to be sealed, such as the stationary seal ring or the rotating seal ring, are thin gaskets to accept a high edge load. These sharp edges apply a high unit loading needed to seal the thin gaskets and their mating parts by minimizing the effective areas of contact. The thin profile of these gaskets is advantageous because loads applied by the edge may spread excessively through thicker gaskets. The resulting loading per unit area transferred to the opposite side of the gaskets may be insufficient to properly seal the opposite side of the gaskets. With the sharp edge profiles, less compression of the bellows is needed to provide the high unit loads (contact stress) needed to seal the gaskets.

One benefit of the foregoing thin gasket design is that rotary squareness between components is maintained because of reduced thickness variation around the gaskets which are advantageously die cut from graphite sheet. Thicker gaskets are less uniform in thickness and density and can cause face distortion and decrease rotary squareness. Additionally, the present invention allows the seal rings to be interchanged and the seal to be assembled in either a rotary or stationary configuration without separate hardware. The present invention eliminates the reliance on press fit rotary faces in metal holders and avoids all ring face deflection problems associated with shrink fits.

A dual sleeve arrangement is utilized having an inner shaft sleeve and an outer sleeve arranged in telescopic orientation with the outer sleeve having a radially inwardly directed flange facing the shaft and fronting an annular edge of the inner shaft sleeve and having a compressible seal clamped therebetween, exposed to the shaft. Compression of the seal seals the dual sleeve arrangement to the shaft.

Both the inner and outer sleeves are fixed to the shaft by set screws, whereas the inner sleeve provides offset tapered apertures for receiving a beveled surface of the set screw; the apertures having an inclined surface to cause protrusion of the set screws toward the shaft to exert an axial force on the inner sleeve to compress the compressible seal.

Arranged between the inner and outer sleeves is an annular channel having a channel inlet on the outboard side of the seal assembly (outboard with respect to the piece of equipment being sealed) and a channel outlet arranged inboard at approximately the interface between the rotating and stationary seal rings. Quenching fluid can flow through this annular channel, exit the channel, and flow past the seal faces and then flow in an outboard direction within a second annular space between the bellows assembly and the outer sleeve to a cartridge outlet for removal from the seal assembly.

BRIEF DESCRIPTION OF THE DRAWINGS

FIG. 1 is a partial sectional view showing a top half of a seal assembly of the present invention;

FIG. 2 is a partial sectional view showing the bottom half of an alternate embodiment of the seal assembly;

DETAILED DESCRIPTION OF THE PREFERRED EMBODIMENTS

Figure 3:
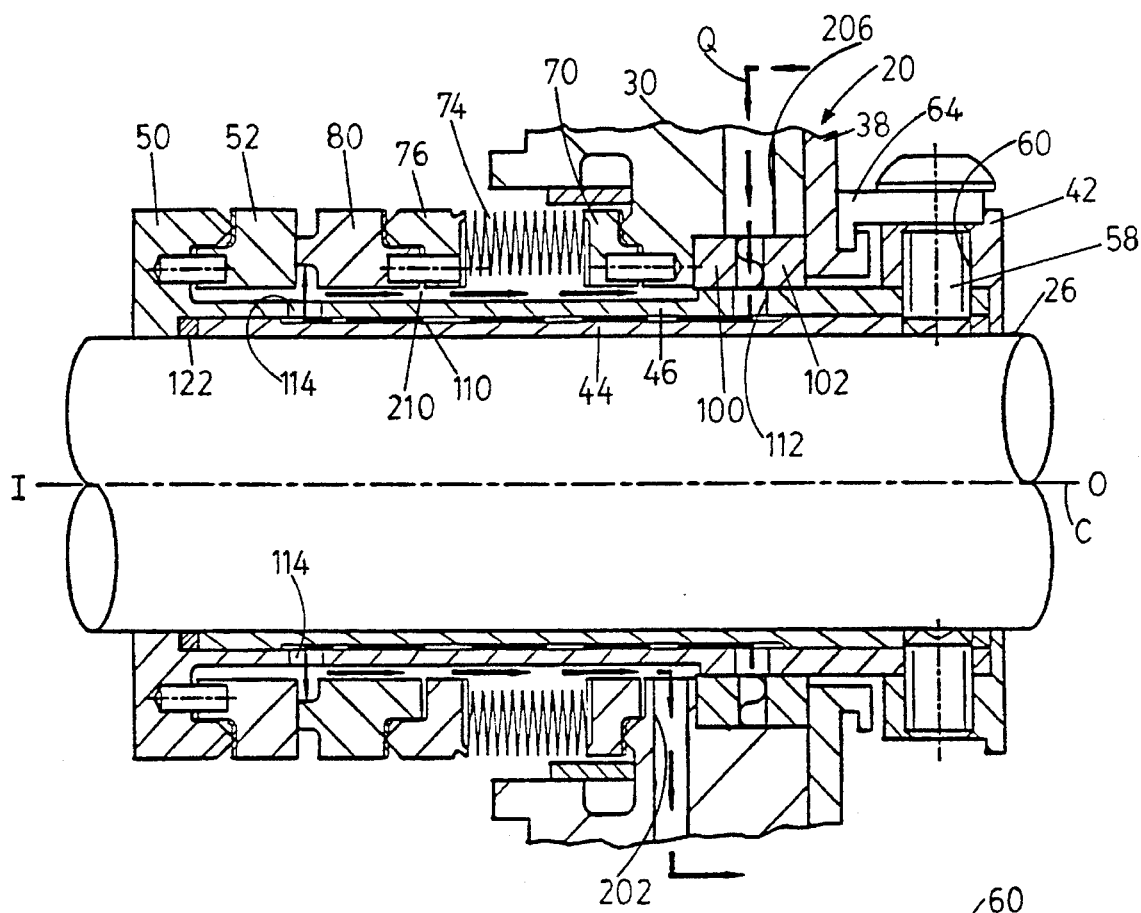
FIG. 3 is a partial sectional view of the seal assembly of FIG. 1 showing the quench flow path therethrough.

FIG. 1 illustrates a cartridge seal assembly 20 mounted on a pump shaft 26 having an inboard end I and an outboard end O. The cartridge seal provides a gland 30 having a flush fluid inlet 34 for flush fluid, a multi-port injector 36 and a retainer 38 mounted stationary with respect to a pump casing (not shown). Mounted for rotation with the shaft 26 is a lock ring 42, an inner sleeve 44 and an outer sleeve 46. The outer sleeve 46 extends radially on an inboard end into a rotary ring holder 50 which holds a rotary seal ring 52 for rotation therewith. A number of pins 54 hold the rotary seal ring to the rotary ring holder or rotation therewith.

A plurality of radially arranged set screws 58 are provided which penetrate the lock ring 42 and the inner and outer sleeves 44, 46. The lock ring 42 provides corresponding threaded apertures 60 for the set screws 58. A plurality of removable centering clips 64 having an L-shaped profile extend from the lock ring 42 to mesh with a channel 66 provided in the retainer 38. These centering clips adjust the position of the gland with respect to the lock ring for proper alignment and centering to the shaft. Extending inboard from the gland 30 is a bellows holder or end fitting 70 attached by pins 72 to the gland 30 for rotation therewith. A bellows 74 extends from the bellows holder 70 on an inboard side thereof. A bellows/seal ring holder 76 is provided on an inboard side of the bellows, affixed to the bellows on one side thereof and contacting a stationary seal ring 80 on an opposite side thereof.

The stationary seal ring 80 abuts the rotary seal ring 52 and the mechanical seal is formed therebetween. The bellows 74 exerts an axial thrust from the gland 30 toward the rotating ring holder 50 to compress all of the components between the gland and the rotary ring holder 50. Arranged on the rotary ring holder 50 is a protrusion 82 having a relatively sharp edge facing the rotary ring 52. Arranged on the bellow/stationary ring holder 76 is a second protrusion 84 having a sharp edge facing the stationary ring 80. Formed on the gland 30 is a protrusion 86 having a sharp edge facing the bellows holder 70. Arranged between the sharp edges of the protrusions 82, 84, 86 and the respective component facing thereto are thin gaskets 92, 94, 96 respectively, preferably 0.015 inches thick and cut from graphite sheet.

These sharp edges apply a high unit loading needed to seal the thin gaskets and their mating parts by minimizing the effective areas of contact. The thin profile of these gaskets is advantageous because loads applied by the edge may spread excessively through thicker gaskets. The resulting loading per unit area transferred to the opposite side of the gaskets may be insufficient to properly seal the opposite side of the gaskets. With the sharp edge profiles, less compression of the bellows is needed to provide the high unit loads (contact stress) needed to seal the gaskets.

One benefit of the foregoing thin gasket design is that rotary squareness between components is maintained because of reduced thickness variation around the gaskets which are advantageously die cut from graphite sheet. Thicker gaskets are less uniform in thickness and density and can cause face distortion and decrease rotary squareness. Additionally, the present invention allows the seal rings to be interchanged and the seal to be assembled in either a rotary or stationary configuration without separate hardware. The present invention eliminates the reliance on press fit rotary faces in metal holders and avoids all ring face deflection problems associated with shrink fits.

Beneath the gland 30 are located floating bushings 100, 102 on opposite sides of a wavespring 104. The double floating bushings which can be carbon bushings, provide double protection against catastrophic seal failures.

It is noted that between the inner sleeve 44 and the outer sleeve 46 is arranged an annular flow channel 110 in communication with quench port 206 (shown in FIG. 2) and a plurality of circumferentially spaced quench fluid inlet apertures 112 wherein quench fluid flows in the channel 110 from an outboard toward an inboard side direction and exits a plurality of circumferentially spaced outlet apertures 114 in the vicinity of the seal rings and flows thereafter outboard past the seal rings, past the bellows and eventually to a quench fluid return outlet 202 (shown in FIG. 2) into the gland. The plurality of apertures 112, 114 provide uniform circumferential flushing of the seal rings for optimum seal life and performance.

Figure 5:
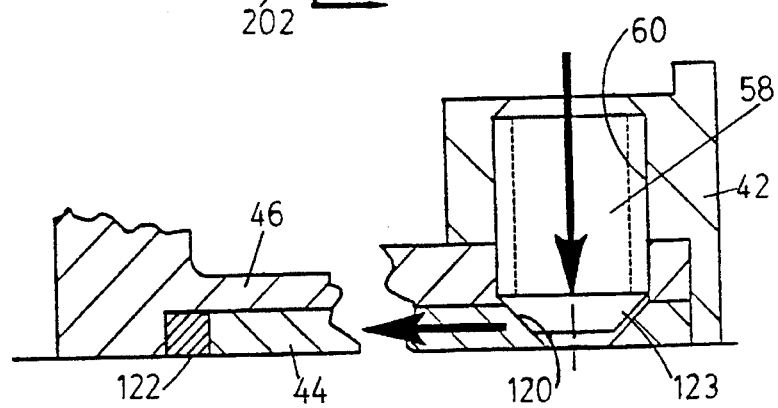
FIG. 5 is an enlarged partial sectional view of the seal assembly of FIG. 1.
Figure 4:
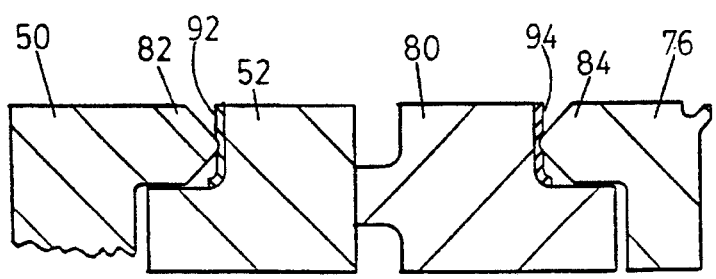
FIG. 4 is an enlarged partial sectional view of the seal assembly of FIG. 1.

As shown in FIG. 5, the set screws 58, when tightened, press upon an inclined surface 120 of the inner sleeve 44 which thrusts the inner sleeve 44 toward the inboard direction which compresses a seal 122 against the shaft 26 to seal both the inner sleeve 44 and the outer sleeve 46 to the shaft 26. The set screws each comprise a beveled end 123 for advantageous mating with the inclined surface 120.

FIG. 2 illustrates an embodiment of the seal cartridge referred to as cartridge 200. Similar parts are given similar numbers. However, in this arrangement, the bellows is arranged on the rotary side of the mechanical seal and rotates with the rotary ring holder 50. It is noted that the axially aligned components from FIG. 1, that is, the rotary ring 52, the stationary ring 80, the bellows/stationary ring holder 76, the bellows 74 and the bellows holder 70 have been reversed in axial arrangement whereas the bellows holder 70 is now abutted to the rotary ring holder 50, the bellows/stationary ring holder 76 is now the bellows/rotary ring holder 76', the stationary ring 80 is now the rotary ring 80' and the rotary ring 52 is now the stationary ring 52'. It is thus clear that the hardware and parts used for a stationary bellows arrangement FIG. 1 can be switched in the present arrangement easily for a rotary bellows seal arrangement. As illustrated in FIG. 2, an outlet 202 is provided for removing quench fluid from the gland.

FIG. 3 illustrates the quench flow path for the cartridge 20. The quench flow path is indicated with arrows O. The quenching fluid flows from the inlet 206 through the openings 112 for delivering quench fluid into the annular channel at spaced apart positions around the circumference of the annular channel for even flow through the annular channel. The details of how to provide a separate annular quench flow inlet path and outlet path within a gland are known, such as, for example U.S. Pat. No. 4,973,065 incorporated herein by reference.

The quench fluid passes between the floating bushings 100, 102 through the area of the wave spring 104. The quench fluid passes through the inlet apertures 112, through the annular channel 110 to the outlet apertures 114, to pass by the interface between the seal rings 52, 80 and then in an outboard direction through an annular region 210 defined between the outer sleeve 46 and the seal rings 52, 80, the bellows/seal ring holder 76, the bellows 74 and the bellows holder 70, and thereupon pass through return inlet 202. This unique annular inboard then outboard flow configuration optimizes the cooling of the seal faces, thereby reducing thermal distortion and maximizing seal life.

Although the present invention has been described with reference to a specific embodiment, those of skill in the art will recognize that changes may be made thereto without departing from the scope and spirit of the invention as set forth in the appended claims.

We claim in our invention:

1. A mechanical seal for a rotating shaft extending through a casing of a rotary fluid handling device, comprising:

a rotary ring holder mounted coaxially onto said shaft to rotate therewith;

a stationary ring holder mounted coaxially around said shaft and fixed to said casing for non-rotation;

a rotary seal ring mounted coaxially around said shaft and fixed for rotation with said rotary ring holder and sealed to said rotary ring holder with a first seal arrangement applied between said rotary seal ring and said rotary ring holder;

a stationary seal ring mounted coaxially around said shaft and fixed for non-rotation to said stationary ring holder and sealed to said stationary ring holder with a second seal arrangement applied between said stationary seal ring and said stationary ring holder, said rotary seal ring and said stationary seal ring in rotary sliding contact and providing a fluid seal therebetween; and at least one of said first and second seal arrangements comprising a protuberance formed on one of the respective seal ring or ring holder, a gasket sealing surface formed on a respective other of the seal ring or ring holder, and a gasket, said protuberance having an edge exerting a localized high contact pressure through a thickness of said gasket onto said gasket sealing surface.

2. The mechanical seal according to claim 1, wherein said rotary seal ring holder comprises said protuberance and said edge comprises a circular sharp edge and is directed at a relatively flat surface of said rotating seal ring.

3. The mechanical seal according to claim 1 further comprising a cylindrical bellows arranged coaxially around said shaft.

4. The mechanical seal according to claim 3 further comprising a gland for receiving quench fluid and circulating quench fluid past said rotary seal ring and said stationary seal ring, said gland mounted stationary with respect to said casing, said bellows arranged to be stationary between said gland and said stationary seal ring.

5. The mechanical seal according to claim 4, wherein said bellows is sealed on opposite axial ends against said stationary seal ring and said gland by high contact pressure seals comprising a gasket compressed by a sharp edged circular protrusion.

6. The mechanical seal according to claim 3, wherein said bellows is arranged between said rotary seal ring and said holder and said bellows is sealed against said holder and said rotary seal ring by high contact pressure seals comprising a gasket compressed by a sharp edged circular protrusion.

7. The mechanical seal according to claim 1 further comprising:

an inner shaft sleeve mounted closely coaxially around said shaft, and an outer shaft sleeve mounted coaxially around said inner shaft sleeve and connected to said holder, said holder closely surrounding said shaft; and a compressible seal arranged between said outer shaft sleeve and said inner shaft sleeve and against said holder, compression of said compressible seal between said inner shaft sleeve and said holder caused by sliding movement of said inner shaft sleeve with respect to said outer shaft sleeve; and means for sliding said inner shaft sleeve with respect to said outer shaft sleeve to compress said compressible seal.

8. The mechanical seal according to claim 7, wherein said means for sliding comprises a lock ring surrounding said shaft and having a plurality of radially arranged threaded apertures and a plurality of set screws threaded into said threaded apertures, and sleeve apertures formed through said inner and outer shaft sleeves, said threaded apertures in registry with said sleeve apertures in said outer shaft sleeve and registerable into said sleeve apertures of said inner shaft sleeve, each of said sleeve apertures of said inner shaft sleeve having an inclined surface, threaded protrusion of said set screws from said lock ring through said sleeve apertures of said outer shaft sleeve and into said sleeve apertures of said inner shaft sleeve against said inclined surfaces slides said inner shaft sleeve with respect to said outer shaft sleeve and compresses said compressible seal.

9. The mechanical seal according to claim 7, wherein said inner shaft sleeve and said outer shaft sleeve are configured to allow an annular channel therebetween and said outer shaft sleeve has an inlet for receiving quench fluid into said annular channel and an outlet from said annular channel to an annular region arranged between said outer shaft sleeve and said rotary and stationary seal rings.

10. The mechanical seal according to claim 1, wherein said gasket is unconfined and said edge of said protuberance provides a sole sealing contact through said gasket thickness onto said gasket sealing surface.

11. The mechanical seal according to claim 10, wherein said gasket has a thin profile shape and is made of graphite.

12. The mechanical seal according to claim 1, wherein said gasket has a thin profile shape and is made of graphite.

13. A mechanical seal for a rotating shaft extending through a casing of a rotary fluid handling device, comprising:

an annular holder mounted coaxially onto said shaft to rotate therewith;

a rotary seal ring mounted coaxially around said shaft and fixed for rotation with said holder;

a gland sealed to, and fixed to, said casing, said gland having a quench fluid inlet and outlet and a flow distribution network therein communicating with said inlet and outlet;

a duct means for delivering quench fluid to said rotary seal ring, said duct means receiving quench fluid from said distribution network;

an inner shaft sleeve mounted closely coaxially around said shaft, and an outer shaft sleeve mounted coaxially around said inner shaft sleeve and connected to said holder, said holder closely surrounding said shaft; and a compressible seal arranged between said outer shaft sleeve and said inner shaft sleeve and against said holder, and inboard of said rotary seal ring, compression of said compressible seal between said inner shaft sleeve and said holder caused by sliding movement of said inner shaft sleeve with respect to said outer shaft sleeve, and set screw means for sliding said inner shaft sleeve with respect to said outer shaft sleeve to compress said compressible seal; and a stationary seal ring mounted coaxially around said shaft and fixed to said gland, said rotary seal ring and said stationary face seal in rotary sliding contact providing a fluid seal therebetween.

14. The mechanical seal according to claim 13 further comprising a cylindrical bellows arranged coaxially around said shaft, said cylindrical bellows arranged to resiliently urge said stationary seal ring and said rotary seal ring together.

15. The mechanical seal according to claim 13, wherein said set screw means for sliding comprises a lock ring surrounding said shaft and having a plurality of radially arranged threaded apertures and a plurality of set screws threaded into said apertures, and apertures through said inner shaft sleeve, said threaded apertures registerable with said apertures of said inner shaft sleeve, said apertures of said inner shaft sleeve each having an inclined surface, protrusion of said set screws through said threaded apertures and into said apertures of said inner shaft sleeve against said inclined surfaces slides said inner shaft sleeve with respect to said outer shaft sleeve and compresses said compressible seal.

16. The mechanical seal according to claim 13, wherein said duct means comprises an annular channel arranged between said inner shaft sleeve and said outer shaft sleeve, and an inlet aperture through said outer shaft sleeve allowing inboard flow from said gland into said annular channel and an outlet aperture from said annular channel to allow flow to an annular region arranged between said outer shaft sleeve and said seal rings and said bellows, and said network has a quench fluid return outlet outboard of said annular region communicating fluid from said annular region to a collecting portion of said gland.

17. A mechanical seal for a rotating shaft extending through a casing of a rotary fluid handling device, comprising:

a rotary seal ring mounted coaxially around said shaft and fixed for rotation with said shaft;

a gland sealed to, and fixed to, said casing, said gland having a quench fluid inlet and outlet and a flow distribution network therein;

a stationary seal ring mounted coaxially around said shaft and fixed for non-rotation to said casing, said rotary seal ring and said stationary seal ring in rotary sliding contact providing a fluid seal therebetween;

an inner shaft sleeve mounted closely coaxially around said shaft, and an outer shaft sleeve mounted coaxially around said inner shaft sleeve wherein said inner shaft sleeve and said outer shaft sleeve are configured to allow an annular channel therebetween and said outer shaft sleeve has an outboard inlet from said gland into said annular channel and an inboard outlet from said annular channel to an annular region arranged between said outer shaft sleeve and said rotary and stationary seal rings, said annular region arranged substantially coaxially with said annular channel, said annular region for channeling quench fluid past said rotary and stationary seal rings to said gland;

a compressible seal ring for sealing between said inner sleeve and said shaft arranged adjacent an inboard end of said inner sleeve; and said inner sleeve slidable with respect to said outer sleeve to compress the compressible seal against said inner sleeve, said shaft, and portions of said outer sleeve.

18. The mechanical seal according to claim 17 further comprising a cylindrical bellows arranged coaxially around said shaft, said cylindrical bellows arranged to resiliently urge said stationary seal ring and said rotary seal ring together.

19. The mechanical seal according to claim 18, wherein said bellows is axially arranged in said annular region and said gland provides a quench fluid return outlet in said annular region for receiving flow from said annular region.

20. The mechanical seal according to claim 18, further comprising a secondary seal ring, a lock ring surrounding said shaft and having a plurality of radially arranged threaded apertures, and a plurality of set screws threaded into said apertures, and said inner shaft sleeve has a plurality of spaced apart radial apertures, said threaded apertures registerable with said apertures of said inner shaft sleeve, said apertures of said inner shaft sleeve each having an inclined surface, protrusion of said set screws through said threaded apertures and into said apertures of said inner shaft sleeve against said inclined surfaces slides said inner shaft sleeve axially with respect to said outer shaft sleeve;

and said outer shaft sleeve provides an annular flange fronting a front edge of said inner shaft sleeve, said secondary seal ring located between said front edge and said annular flange, compressed therebetween by said sliding of said inner shaft sleeve.

21. The mechanical seal according to claim 18 further comprising a secondary seal ring sealing said inner shaft sleeve to said shaft, and wherein said secondary seal ring is located inboard of said bellows.

22. The mechanical seal according to claim 17 further comprising a secondary seal ring, sealing said inner shaft sleeve to said shaft, and wherein said secondary seal ring is located inboard of said annular channel.

* * * * *